April 23, 1968 — L. SPIEGEL — 3,379,070
CONTROL APPARATUS

Filed June 26, 1963 — 2 Sheets-Sheet 1

INVENTOR.
LEO SPIEGEL
BY Roger W. Jensen
ATTORNEY

April 23, 1968   L. SPIEGEL   3,379,070
CONTROL APPARATUS

Filed June 26, 1963   2 Sheets-Sheet 2

INVENTOR.
LEO SPIEGEL
BY Roger W. Jensen
ATTORNEY

United States Patent Office 3,379,070
Patented Apr. 23, 1968

3,379,070
CONTROL APPARATUS
Leo Spiegel, Clearwater, Fla., assignor to Honeywell Inc.,
a corporation of Delaware
Filed June 26, 1963, Ser. No. 290,664
8 Claims. (Cl. 74—5)

The present invention is related to inertial instruments and more particularly to gyroscopic inertial instruments in which the inertial member is a sphere universally supported by means of fields for rotation about a spin axis.

In prior art mechanically supported inertial instruments, the inertial member or seismic mass was often intentionally torqued for a variety of reasons. For example, torquing could be employed to achieve initial alignment of the spin axis or to offset errors in the instrument due to known factors, causing predictable or measurable errors. Never has, however, the torquing been employed in inertial instruments where the member is supported by electric or magnetic fields because of the inherent difficulty in providing the high precision and accuracy required and expected from this new generation of inertial instruments. To make precision torquing feasible, without disturbing the suspension of the member, a number of difficult problems had to be solved. The present invention has solved these problems to a remarkable degree and has made a precision torque field supported inertial instrument feasible.

A factor making the torquing of a field supported spherical inertial member possible is that at high angular velocities the inertial member will deform to an oblate spheroid. Such deformation does not affect the symmetry of the inertial member about its spin axis or about its equatorial plane, but it does destroy its sphericity. If the supporting field producing elements are arranged so that for every element in one of the hemispheres a corresponding element appears in the opposite hemisphere and the element structure forms a configuration which is substantially symmetrical about the equatorial plane, torques may be applied to the inertial member by supplying forces of different magnitude at the supporting elements. If the inertial member were a perfect sphere, all of the forces would act through the center of the member and the torquing of the inertial member would not be possible. Due to the deformation of the inertial member at high angular velocities, the sphericity of the inertial member is destroyed and the forces do not act through the center of the member. Consequently, it is possible to torque the member about any axis perpendicular to the spin axis of the inertial member by applying forces at appropriate points on the member. Since the torquing will be about axes perpendicular to the spin axis, it will not affect the angular velocity of the inertial member.

It is therefore an object of this invention to provide an improved inertial instrument.

A more specific object of this invention is to provide a capability in an inertial instrument to torque the inertial member about any axis perpendicular to the spin axis.

These and further objects will become apparent to those skilled in the art upon consideration of the accompanying specification, claims, and drawings of which:

Figure 1:
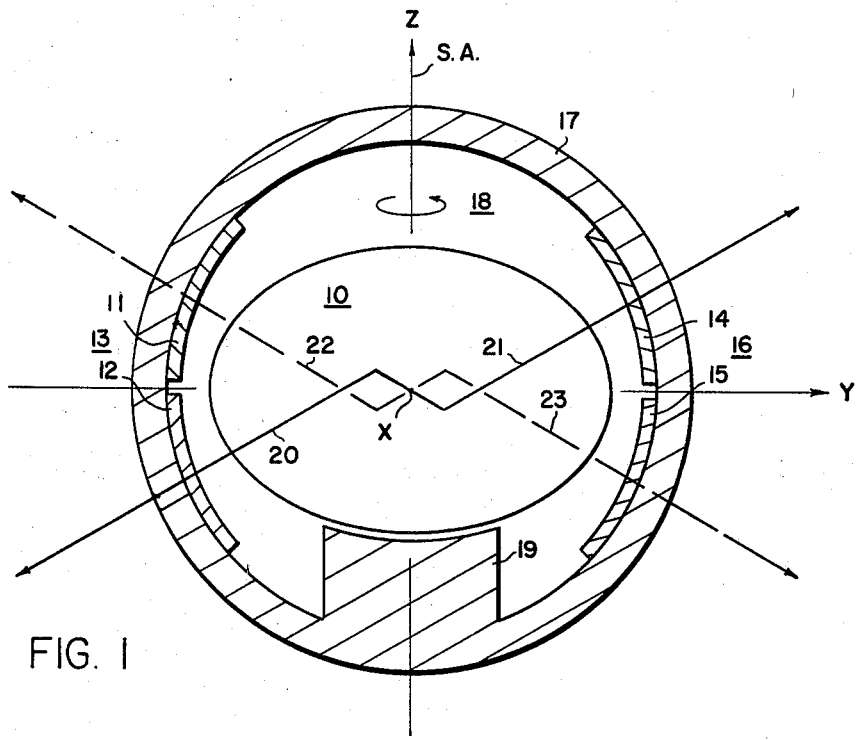
FIGURE 1 is a pictorial representation of the forces acting on an inertial member which exhibits the shape of an oblate spheroid.

Referring to FIGURE 1, an electrically conductive inertial member or rotor 10, which at operating angular velocities has the shape of an oblate spheroid, is supported by a support 19 and adapted to rotate about a spin axis Z. A pair of mutually perpendicular axes X and Y are depicted to lie in the equatorial plane of inertial member 10 and together with spin axis Z provide a space coordinate system which will be referred to in the following discussion. As depicted, axis Y lies in the plane of the paper and axis X is perpendicular to the plane of the paper. The equatorial plane is referred to as the XY or Z-O plane. A pair of electrodes 11 and 12 are mounted on a housing 17 defining an insulative spherically shaped cavity 18 and are positioned adjacent to inertial member 10 on the —Y side of the inertial member with electrode 11 in the upper or +Z hemisphere and electrode 12 in the lower or —Z hemisphere. Electrode 12 is a mirror image of electrode 11 with symmetry about the Z-O plane. Electrodes 11 and 12 comprise an electrode pair 13. An identical pair of electrodes 14 and 15 are mounted on housing 17 and adjacent inertial member 10 on the +Y side of the member. Electrodes 14 in the upper hemisphere and 15 in the lower hemisphere form an electrode pair 16.

Figure 2:
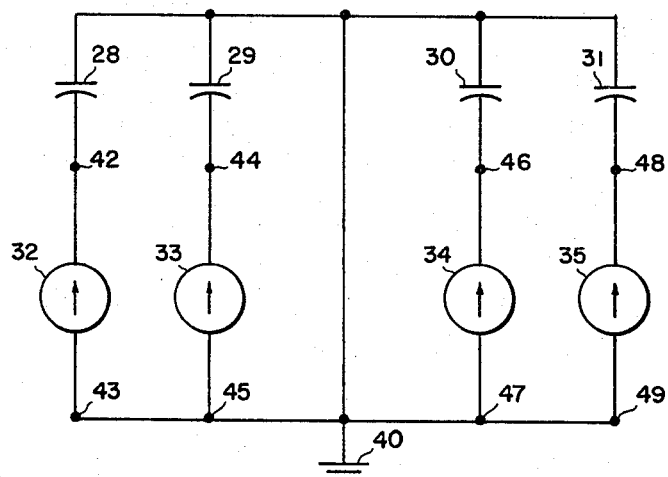
FIGURE 2 is a schematic diagram of one channel of the suspension system incorporating the present invention.
Figure 3:
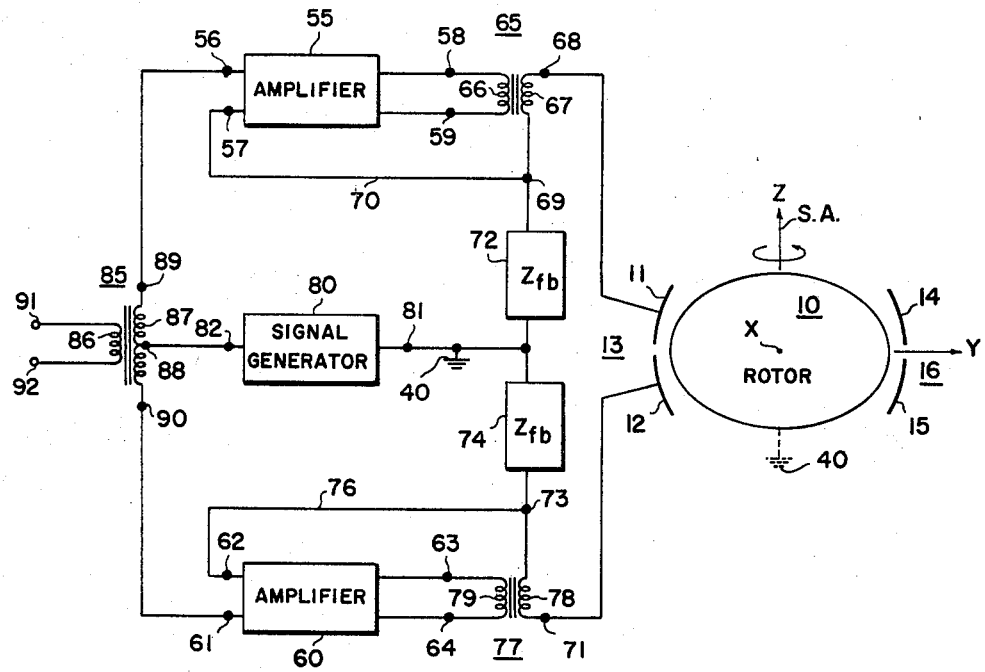
FIGURE 3 is a schematic diagram of a circuit adapted to provide differential forces at a pair of electrodes.

Electric fields are established between the electrodes and member 10 by means shown in FIGURES 2 and 3. The resultant attractive electric forces act on the member as depicted by the force vectors in FIGURE 1. If the inertial member were a perfect sphere, all of these force vectors would act through the center of the member and no rotational torque could be induced. Since, however, the member is slightly deformed to an oblate spheroid due to angular velocity of the member, the forces do not act through the center of the member but act through points slightly off the center. The forces between electrode 12 and member 10 and electrode 14 and member 10 form a couple acting in a counterclockwise direction about the axis, as shown by force vectors 20 and 21. A force vector 22 acts between member 10 and electrode 11 and a force vector 23 acts between member 10 and electrode 15, the two vectors 22 and 23 producing a second couple acting in a clockwise direction about the X axes. Which way the resultant couple acts of course depends on the relative magnitudes of the forces at the electrodes. Clearly, should the forces at the two electrodes of each pair be equal, no rotational forces would be applied to the member and the resultant couple would be zero. In other words, when the forces between the inertial member 10 and the two electrodes of a pair are equal the forces will add in such a way that the net resultant force will act through the center of the member capable of producing translational forces but not rotational forces. The inertial member can therefore be torqued by applying forces of different magnitude at the two electrodes of a pair.

Assume that a steady state electric field exists between the member and the electrodes and that under normal conditions the forces between the member and each electrode are the same. To egt a maximum torque about the X axis in a clockwise direction, then, the forces shall be increased between the member and electrodes 11 and 15 and decreased between the member and electrodes 12 and 14. To maintain the translational forces along the Y axis in balance and unchanged, it is required that the force at electrode 11 increases by the same amount as the force between electrode 12 and member 10 decreases, and that the force between the member and electrode 15 increases by an amount corresponding to the decrease in the force between electrode 14 and member 10. It is not necessary, however, that the forces between electrode 12 and member 10 and between electrode 14 and member 10 be equal, or be increased by the same amount. It is only important that the sum of the two forces between the member and the two electrodes of each pair remains constant so that the net translational force on the member also remains constant.

Assume that force vectors 22 and 23 are increased and the force vectors 20 and 21 are decreased so that the resultant couple acting on the inertial member 10 will act in a clockwise direction about the X axis. This resultant torque acting on the member about the Y axis will tend to precess the inertial member in a clockwise direction about the Y axis looking from the +Y side of the member. A torque in the opposite direction can be obtained by increasing the magnitudes of the force vectors 20 and 21 and decreasing the magnitudes of force vectors 22 and 23. To obtain similar torquing capability about the X axis, a similar set of electrodes can be centered on the X axis. It should be noted again that the present invention does not produce any torques about the spin axis Z and will therefore not introduce any errors in the angular velocity of the member.

As was mentioned before, when the forces at the two electrodes of a pair are the same the resultant force acts through the center of the member. The difference of the forces at the two electrodes of a pair represents the rotational torque applied to the member and the sum of the two forces represents the translational force on the member. It is therefore possible, using the arrangement of FIGURE 1, to provide torquing of the member about the X axis while at the same time balancing the translational forces on the member along the Y axis. It can be seen, therefore, that the same electrodes may be used to provide the suspension forces and the torquing capability and that the torquing of the member will not interfere with suspension. The present invention is therefore well adapted for mechanization in almost any type of suspension system and is especially well adapted for use in the type of electrostatic suspension system shown in patent application 242,549, filed Dec. 5, 1962, in the name of Robert C. Staats, and titled, Control Apparatus. That invention is also assigned to the assignee of the present invention.

In the preceding discussion the inertial member was referred to as a sphere which at high angular velocities deforms to an oblate spheroid. It should be understood, however, that the present invention would function equally well where the inertial member had no angular velocity if the inertial member were designed to possess the shape of an oblate spheroid in its nonrotating state. An oblate spheroid is defined by the rotation of an ellipse about its minor axis. The minor axis is then the axis of universal symmetry in the spheroid and corresponds to the spin axis in the rotating sphere deformed to an oblate spheroid. The present invention, in fact, is well adapted for application in any way interial instrument where the inertial member in its operating mode is not a perfect sphere and it is not intended to be limited to any particular geometric configuration.

Figure 4:
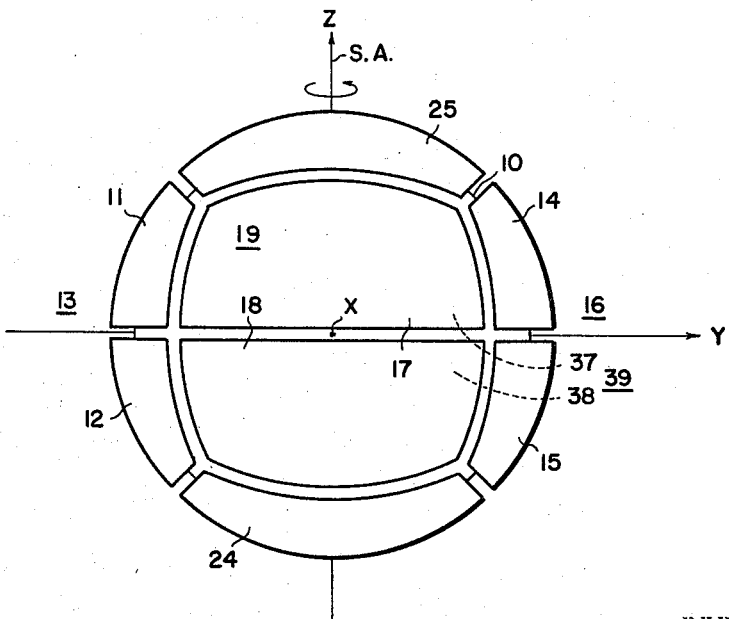
FIGURE 4 shows one possible configuration of the electrode structure to be used with this invention.

The preferred embodiment of the electrode structure to be used in this invention is shown in FIGURE 4 where, in addition to electrode pairs 13 and 16 centered on the Y axis, electrode pairs 19 and 39 comprised of electrodes 17 and 18, and 37 and 38 respectively are centered on the X axis to give the torquing capability about the X axis. Electrodes 37 and 38 are hidden behind the structure of FIGURE 4. Electrodes 23 and 24, each having an area equal to the combined areas of the two electrodes of any of the electrode pairs along the X or Y axis, are positioned on the Z axis. The electrode structure is basically the same as that shown in the above referenced patent application of Robert C. Staats. In the electrode configuration there is basically a hexahedral or expanded cube type of formation which is modified for application in this invention by splitting the electrodes along the X and Y axes into equal halves symmetrical about the XY or Z–O plane. The present invention is therefore well adapted for the type of suspension shown in the Staats application, to allow the use of the same electrodes for both the suspension and the torquing capability. It should be understood, however, that the present invention is not limited to any particular type of suspension.

FIGURE 2 depicts a schematic diagram of an equivalent circuit necessary to provide a torquing capability along one axis. A current generator 32 has terminals 42 and 43. Terminal 43 of current generator 32 is connected directly to ground 40 and terminal 42 is connected to ground 40 through a capacitor 28. A current generator 33 has terminals 44 and 45 with terminal 45 connected directly to ground 40 and terminal 44 connected to ground 40 through a capacitor 29. In the same manner, a current generator 34 has terminals 46 and 47 and a current generator 35 has terminals 48 and 49. Terminal 47 of generator 34 and terminal 49 of generator 35 are connected to ground 40 while terminal 46 of generator 34 is connected to ground 40 through a capacitor 30 and terminal 48 of generator 35 is connected to ground 40 through a capacitor 31. Correlating FIGURE 2 with FIGURE 1, capacitor 28 of FIGURE 2 represents the capacitance between electrode 11 and member 10 of FIGURE 1 and capacitor 29 of FIGURE 2 represents the capacitance between electrode 12 and member 10. In the same manner capacitor 30 represents the capacitance between electrode 14 and member 10 and capacitor 31 represents the capacitance between electrode 15 and member 10. By controlling the currents at the electrodes, the electric forces between the electrodes and the member are correspondingly controlled. Current generators 32 and 33 are supplying the current for electrodes 11 and 12 of electrode pair 13 respectively. When these two currents are equal the electric forces between each electrode and the member are equal also since the areas of the two electrodes are equal. Under this condition the forces at the two electrodes add in such a way that the resultant force acts through the center of the member and no torquing of the member is possible. By controlling the relative magnitudes of the current at the two electrodes of a pair it is then possible to control the magnitude of the torques applied to the inertial member 10. The currents are similarly controlled at electrode pair 16 by increasing the current at electrode 11 of electrode pair 13 and electrode 15 of electrode pair 16 and simultaneously decreasing the current at electrode 12 of electrode pair 13 and electrode 14 of pair 16, the member can be effectively torqued.

FIGURE 3 shows one possible means of controlling currents at an electrode pair so that when a signal of one polarity is applied at its input the current at the first electrode of the pair increases and the current at the second electrode decreases by an equal amount. When a signal of opposite polarity is applied to the input, the current at the first electrode decreases and the current at the second electrode increases.

Input terminals 91 and 92 are the end terminals of a primary winding 86 of transformer 85. Transformer 85 further has a secondary winding 87 with end terminals 89 and 90 and the center tap 88. Center tap 88 of secondary winding 87 is connected to an output terminal 82 of an oscillator 80 while end terminal 89 of winding 87 is connected to an input terminal 56 of an amplifier 55 and end terminal 90 of winding 87 is connected to an input terminal 61 of an amplifier 60. Oscillator 80 also has an output terminal 81 connected directly to ground 40. Amplifier 55 further has an input terminal 57 and output terminals 58 and 59. Output terminals 58 and 59 of amplifier 55 are also end terminals of a primary winding 66 of a transformer 65. Transformer 65 also has a secondary winding 67 with end terminals 68 and 69. End terminal 69 of winding 67 is connected to the input terminal 57 of amplifier 55 by means of a conducting lead 70 and is further connected to ground 40 through a feedback impedance 72. End terminal 68 of secondary winding 67 is connected to an electrode 11 positioned adjacent to rotating inertial member or rotor 10 which has an angular velocity about a spin axis Z.

Amplifier 60 also has an input terminal 62 and output terminals 63 and 64. Output terminals 63 and 64 are also end terminals of a primary winding 79 of a transformer 77. Transformer 77 further has a secondary winding 78 with end terminals 71 and 73. End terminal 73 of secondary winding 78 is connected directly to input 62 of amplifier 60 by means of a conductor 76 and also to ground 40 through a feedback impedance 74. End terminal 71 of winding 78 is connected to an electrode 12 positioned adjacent to inertial member 10. Electrodes 11 and 12 are located adjacent to each other in the manner illustrated by FIGURE 1 and FIGURE 3 and explained with reference to FIGURE 1.

The signal generator 80 provides an output signal at its output terminal 82 which is fed in parallel to input 56 of amplifier 55 and input 61 of amplifier 60. Amplifiers 55 and 60 are identical and can be any one of the standard amplifiers well known to those skilled in the art. For the moment it is assumed that the signal between input terminals 91 and 92 is zero.

In amplifier 55 the signal is amplified and impressed on the primary winding 66 of transformer 65 between end terminals 58 and 59. Primary winding 66 energizes the secondary winding 67 between terminals 68 and 69 and thus energizes electrode 11 which is connected to the end terminal 68. An electric field is established between electrode 11 and inertial member 10 which results in an attracted force between electrode 11 and rotor 10, the magnitude of which is proportional to the magnitude of the signal at the output of amplifier 55. In the same way, a signal from amplifier 60 is impressed across the primary winding 79 of transformer 77 and induced in the secondary winding 78 of transformer 77 between end terminals 71 and 73. End terminal 71 of winding 78 is connected to electrode 12 facing rotor 10 and energizes electrode 12 to produce an electrostatic force between electrode 12 and rotor 10.

In normal operation, when no torquing of the inertial member 10 is desired, the signal between the input terminals 91 and 92 is zero and the currents energizing electrodes 11 and 12 are equal. When torquing is desirable, however, a signal of appropriate polarity is applied between input terminals 91 and 92 across primary winding 86 of transformer 85. This signal is then induced in the secondary winding 87 and adds to the input signal of one amplifier while it subtracts from the input signal to the other amplifier. A signal between input terminals 91 and 92 therefore increases the output of one amplifier and decreases the output of the other amplifier by a corresponding amount, which in turn will increase the electric force at one electrode and decrease the electric force at the other electrode. Electrodes 14 and 15 may be energized in a similar way to provide a torquing capability about the Y axis as described with reference to FIGURE 1.

Many variations and embodiments are possible within the spirit of this invention. It is, therefore, understood that the specific embodiment of my invention shown here is for the purpose of illustration only, and that my invention is limited only by the scope of the appended claims.

What is claimed is:

1. An inertial instrument comprising:
   a housing having an insulative menas defining a generally hollow spherically shaped cavity;
   an electrically conductive, substantially spherically shaped oblate member having upper and lower hemispheres positioned within said cavity, said member having an axis of universal symmetry, passing centrally through said two hemispheres;
   supporting means provided within said cavity to support said member free of physical contact with said envelope for relative motion with said housing;
   two electrically isolated electrodes mounted on said insulating means of said housing at substantially diametrically opposite locations and adjacent to said member, one of said electrodes being positioned adjacent said upper hemisphere and the other of said electrodes being positioned adjacent said lower hemisphere; and
   means connected to said electrodes for establishing and controlling electric forces between said electrodes and said member for the purpose of applying torques to said member about an axis perpendicular to said axis of universal symmetry.

2. An inertial instrument comprising:
   a housing having an insulative spherically shaped cavity;
   an electrically conductive, substantially spherically shaped oblate member positioned within said cavity, said member having an axis of universal symmetry, and further having a plane of symmetry normal to said axis of universal symmetry and dividing said member into upper and lower hemispheres;
   supporting means provided within said cavity to support said member for relative motion with said housing;
   a first and a second pair of electrically isolated electrodes mounted on said insulative means, said first pair comprised of a first electrode in said upper hemisphere and a second electrode in said lower hemisphere adjacent to said first and said second pair comprised of a third electrode in said upper hemisphere and a fourth electrode in said lower hemisphere adjacent to said third electrode, said first pair being positioned in said spherical cavity in diametric opposition to said second pair; and
   means connected to said electrodes for establishing electric fields between said electrodes and said member, including means for controlling said electric fields between said member and said electrodes so that when a rotational force in a first direction is required, the electric forces between said member and said first and said third electrodes increase, while the electric forces between said member and said second and said fourth electrodes decrease, and when a rotational force in a second direction is required, the electric forces between said member and said first and said third electrodes decrease, while the electric forces between said member and said second and said fourth electrodes increase.

3. An internal instrument comprising:
   a housing having an insulative spherically shaped cavity;
   an electrically conductive, substantially spherically shaped oblate member positioned within said cavity, said member having an axis of universal symmetry, and further having a plane of symmetry normal to said axis of universal symmetry and dividing said member into upper and lower hemispheres;
   supporting means provided within said cavity to support said member for relative motion with said housing; a first and a second pair of electrically isolated electrodes mounted on said insulative means, said first pair comprised of a first electrode in said upper hemisphere and a second electrode in said lower hemisphere adjacent to said first electrode, and said second pair comprised of a third electrode in said upper hemisphere and a fourth electrode in said lower hemisphere adjacent to said third electrode, said first pair being positioned in said spherical cavity in diametric opposition to said second pair; and
   means connected to said electrodes for establishing electric fields between said electrodes and said member, including means for controlling the electric forces between said member and said electrodes for the purpose of applying rotational torques to said inertial member.

4. An inertial instrument comprising:
a housing having an insulative spherically shaped cavity;
an electrically conductive, substantially spherically shaped oblate member positioned within said cavity, said member having an axis of universal symmetry, and further having a plane of symmetry normal to said axis of universal symmetry and dividing said member into upper and lower hemispheres;
supporting means provided within said cavity to support said member for relative motion with said housing;
an electrode structure having symmetry about said plane of symmetry comprised of four pairs of electrically isolated electrodes mounted on said insulative means, each said pair comprised of a first electrode in said upper hemisphere and a second electrode in said lower hemisphere, said two electrodes of each pair being adjacent to each other and separated by said plane of symmetry, two of said pairs being positioned substantially in diametric opposition on a first axis and the other two of said pairs being positioned substantially in diametric opposition on a second axis normal to said first axis; and
means connected to said electrodes for establishing electric forces between said electrodes and said member including means for controlling said forces for the purpose of applying rotational forces to said member an axis perpendicular to said axis of universal symmetry.

5. An inertial instrument comprising:
a housing having an insulative spherically shaped cavity;
an electrically conductive, substantially spherically shaped oblate member positioned within said cavity, said member having an axis of universal symmetry, and further having a plane of symmetry normal to said axis of universal symmetry and dividing said member into upper and lower hemispheres;
supporting means provided within said cavity to support said member for relative motion with said housing;
a plurality of pairs of electrically isolated electrodes mounted on said insulative means, each said pair comprised of a first electrode in said upper hemisphere and a second electrode in said lower hemisphere, said first and said second electrodes of each pair being adjacent to each other and separated by said plane of universal symmetry, said electrode pairs being arranged uniformly along the periphery of a circle formed by the intersection of said plane of universal symmetry with said spherical cavity;
means connected to said electrodes for establishing electric fields between said electrodes and said member, including means for controlling the electric forces between said member and both electrodes of each of said electrode pairs for the purpose of applying rotational torques to said inertial member.

6. An inertial instrument comprising:
a housing;
an electrically conductive nonspherical member positioned within said housing;
supporting means provided within said housing to support said member for relative motion with said housing;
a plurality of electrically isolated electrodes mounted on said housing and adjacent to said member; and
means connected to said electrodes for establishing and controlling electric forces between said member and said electrodes for the purpose of applying rotational torques to said member.

7. An inertial instrument comprising:
a housing;
an electrically conductive member positioned within said housing, said member having a shape of an oblate spheroid defined by revolution of an ellipse about its minor axis, said minor axis being the axis of universal symmetry within said member;
supporting means provided within said housing to support said member for relative motion with said housing;
an electrode mounted on said housing and adjacent to said member; and
means connected to said electrodes for establishing and controlling electric forces between said member and said electrodes for the purpose of applying a torque to said member about an axis perpendicular to said axis of universal symmetry.

8. An inertial instrument comprising:
a housing;
an electrically conductive member positioned within said housing, said member having a shape of an oblate spheroid defined by revolution of an ellipse about its minor axis, said minor axis being the axis of universal symmetry within said member;
supporting means provided within said housing to support said member for relative motion with said housing;
a plurality of electrically isolated electrodes mounted on said housing and adjacent to said member; and
means connected to said electrodes for establishing and controlling electric forces between said member and said electrodes for the purpose of applying a torque to said member about an axis perpendicular to said axis of universal symmetry.

References Cited

UNITED STATES PATENTS 3,003,356  10/1961  Nordsieck _____ 74—5
3,098,679  7/1963   De Boice _____ 308—8

OTHER REFERENCES

German printed application No. 1,062,965, Aug. 6, 1959.

MILTON KAUFMAN, *Primary Examiner.*

SAMUEL FEINBERG, CORNELIUS J. HUSAR,
*Examiners.*

R. F. STAHL, *Assistant Examiner.*

UNITED STATES PATENT OFFICE
CERTIFICATE OF CORRECTION

Patent No. 3,379,070                            April 23, 1968

Leo Spiegel

It is certified that error appears in the above identified patent and that said Letters Patent are hereby corrected as shown below:

Column 5, line 67, "menas" should read -- means --.
Column 6, line 51, "internal" should read -- inertial --.
Column 7, line 31, after "member" insert -- about --.

Signed and sealed this 9th day of December 1969.

(SEAL)
Attest:

Edward M. Fletcher, Jr.                    WILLIAM E. SCHUYLER, JR.
Attesting Officer                           Commissioner of Patents